(12) United States Patent
Mao

(10) Patent No.: US 11,755,525 B2
(45) Date of Patent: Sep. 12, 2023

(54) SYSTEM INCLUDING PIPE5 TO PIPE4 CONVERTER AND METHOD THEREOF

(71) Applicant: SK hynix Inc., Gyeonggi-do (KR)

(72) Inventor: Jinliang Mao, Fremont, CA (US)

(73) Assignee: SK hynix Inc., Gyeonggi-do (KR)

( * ) Notice: Subject to any disclaimer, the term of this patent is extended or adjusted under 35 U.S.C. 154(b) by 114 days.

(21) Appl. No.: 17/230,759

(22) Filed: Apr. 14, 2021

(65) Prior Publication Data

US 2022/0334999 A1 Oct. 20, 2022

(51) Int. Cl.
| | | |
|---|---|---|
| G06F 13/42 | (2006.01) | |
| G06F 13/40 | (2006.01) | |
| G06F 9/54 | (2006.01) | |
| G06F 9/30 | (2018.01) | |
| G06F 13/38 | (2006.01) | |

(52) U.S. Cl.
CPC ...... *G06F 13/4221* (2013.01); *G06F 9/30101* (2013.01); *G06F 9/546* (2013.01); *G06F 13/387* (2013.01); *G06F 13/4027* (2013.01); *G06F 2213/0026* (2013.01)

(58) Field of Classification Search
CPC .............. G06F 13/4221; G06F 13/387; G06F 13/4027; G06F 2213/0026; G06F 9/30101; G06F 9/546
See application file for complete search history.

(56) References Cited

U.S. PATENT DOCUMENTS

| | | | |
|---|---|---|---|
| 8,090,789 B1 | 1/2012 | O'Shea et al. | |
| 9,575,552 B2 | 2/2017 | Por et al. | |
| 10,817,443 B2 | 10/2020 | Mao et al. | |
| 11,100,028 B1* | 8/2021 | Subramaniam | ..... G06F 13/4221 |
| 11,375,050 B1* | 6/2022 | Mittal | ..................... H04L 69/08 |
| 2018/0120921 A1* | 5/2018 | Yifrach | ............... G06F 13/4273 |
| 2019/0303342 A1* | 10/2019 | Jen | ...................... G06F 13/4068 |
| 2019/0310959 A1* | 10/2019 | Iyer | ..................... G06F 13/1689 |

OTHER PUBLICATIONS

PHY Interface for the PCI Express, SATA, USB 3.1, DispiayPort, and USB4 Architectures Version 6, Jun. 22, 2020.

* cited by examiner

*Primary Examiner* — Nimesh G Patel
(74) *Attorney, Agent, or Firm* — IP&T Group LLP

(57) ABSTRACT

Embodiments of the present invention provide a PIPE5 to PIPE4 converter to provide compatibility between a PIPE5 controller and a PIPE4 test device. The converter includes a first interface coupled to the PIPE5 controller including MAC registers through a message bus interface, a second interface coupled to the PIPE4 device through a PCIe link and PHY registers. When a first message bus interface signal is received from the PIPE5 controller, the first interface finds a target PHY register based on the first message bus interface signal, and the second interface generates a first link interface signal associated with the target PHY register and outputs the first link interface signal to the PIPE4 device.

14 Claims, 15 Drawing Sheets

FIG. 4

PHY Requirements for Legacy Pin Interface vs Low Pin Count Interface and Original PIPE vs SerDes Architecture Support

| | USB4/ DisplayPort | USB 3.2 and Less | PCIe 5.0 | PCIe 6.0 | PCIe 4.0 and Less | SATA |
|---|---|---|---|---|---|---|
| Legacy Pin Interface | Not Allowed | Required (see version 4.4.1) | Not Allowed | Not Allowed | Required (see version 4.4.1) | Required (see version 4.4.1) |
| Low Pin Count Interface | Required | Optional | Required | Required | Required for Gen4 RX margining only, optional for everything else | Optional |
| Original PIPE Architecture | Not Allowed | Required | Recommended | Not Allowed | Required | Required |
| SerDes Architecture | Required | Optional | Required | Required | Optional | Optional |

FIG. 5A

| PCIe controller version | PCIe PHY version | Simulation/Validation version | Result |
|---|---|---|---|
| PIPE5 | PIPE5 | PIPE5 | OK to test Gen5 |
| PIPE5 | Not used | PIPE4 | Not OK to test Gen4 and Gen3 |

FIG. 5B

| PCIe controller version | PIPE5 to PIPE4 converter | PCIe PHY version | Simulation/Validation version | Result |
|---|---|---|---|---|
| PIPE5 | off | PIPE5 | PIPE5 | OK to test Gen5 |
| PIPE5 | on | Not used | PIPE4 | OK to test Gen4 and Gen3 |

FIG. 8

Message Bus Interface Signals

| Name | Direction | Description |
|---|---|---|
| M2P_MessageBus[7:0] | Input | The MAC multiplexes command, any required address, and any required data for sending read and write requests to access PHY PIPE registers and for sending read completion responses and write ack responses to PHY initiated requests. |
| P2M_MessageBus[7:0] | Output | The PHY multiplexes command, any required address, and any required data for sending read and write required to access MAC PIPE registers and for sending read completion responses and write ack responses to MAC initiated requests. |

FIG. 9

Message Bus Commands

| Encoding | Command | Description | Required Fields | Cycles to Transmit |
|---|---|---|---|---|
| 4'b0000 | NOP | Idle. See Figure 6-1 | Command[3:0] | 1 |
| 4'b0001 | write_uncommitted | The current write should be saved off into a write buffer and its associated data values are updated into the relevant PIPE register at a write_committed is received. This is useful for signals that must change in the same cycle but that are distributed among mulriple | Command[3:0], Address[11:0], Data[7:0] | 3 |
| 4'b0010 | write_committed | The current write as well as any previously uncommitted writes saved into the write buffer should be committrd, i.e. their values should be updated into the PIPE registers. Onec a write_committed is sent, no new writes, Whether committed or uncommitted, may be sent until a write_ack is received. See Figure 6-4. | Command[3:0], Address[11:0], Data[7:0] | 3 |
| 4'b0011 | read | Used to read contents of a PIPE register. Only one read can be outstanding at a time in each direction. See Figure 6-2. | command[3:0] Address[11:0] | 2 |
| 4'b0100 | read completion | Data response to a read. See Figure 6-3. | Command[3:0], Data[7:0] | 2 |
| 4'b0101 | write_ack | Used to acknowledge receipt of a write_committed and readiness to accept another write. The ack is sent when the write buffer is flushed and the resulting PIPE operation is guaranteed to start in a deterministic amount of time. Note: This does not provide confirmation that the PIPE operation triggered by the write has completed. See Figure 6-1. | Command[3:0] | 1 |
| All others | Reserved | N/A | N/A | N/A |

FIG. 10A

| | M2P/P2M_MessageBus | | | | | | | |
|---|---|---|---|---|---|---|---|---|
| | 7 | 6 | 5 | 4 | 3 | 2 | 1 | 0 |
| t | Cmd[3:0] | | | | 0000b | | | |

Time

Command Only Message Bus Transaction Timing (NOP, write_ack)

FIG. 10B

| | M2P/P2M_MessageBus | | | | | | | |
|---|---|---|---|---|---|---|---|---|
| | 7 | 6 | 5 | 4 | 3 | 2 | 1 | 0 |
| t | Cmd[3:0] | | | | Addr[11:8] | | | |
| t+1 | Addr[7:0] | | | | | | | |

Time

Command+Address Message Bus Transaction Timing (Read)

FIG. 10C

| | M2P/P2M_MessageBus | | | | | | | |
|---|---|---|---|---|---|---|---|---|
| | 7 | 6 | 5 | 4 | 3 | 2 | 1 | 0 |
| t | Cmd[3:0] | | | | 0000b | | | |
| t+1 | Data[7:0] | | | | | | | |

Time

Command+Data Message Bus Transaction Timing (Read completion)

FIG. 10D

| | M2P/P2M_MessageBus | | | | | | | |
|---|---|---|---|---|---|---|---|---|
| | 7 | 6 | 5 | 4 | 3 | 2 | 1 | 0 |
| t | Cmd[3:0] | | | | Addr[11:8] | | | |
| t+1 | Addr[7:0] | | | | | | | |
| t+2 | Data[7:0] | | | | | | | |

Time

Command+Address+Data Message Bus Transaction Timing (Write_uncommitted, Write_committed)

FIG. 12A

PHY Registers

| Byte Address | Register Name | Notes |
|---|---|---|
| 12'h0 | RX1:RX Margin Control0 | |
| 12'h1 | RX1:RX Margin Control1 | |
| 12'h2 | RX1:Elastic Buffer Control1 | N/A for SerDes Architecture |
| 12'h3 | RX1:PHY RX Control0 | N/A for SerDes Architecture |
| 12'h4 | RX1:PHY RX Control1 | |
| 12'h5 | RX1:PHY RX Control2 | |
| 12'h6 | RX1:PHY RX Control3 | |
| 12'h7 | RX1:Elastic Buffer Location Update Frequency | N/A for SerDes Architecture |
| 12'h8 | RX1:PHY RX Control4 | Some fields N/A for SerDes Architecture |
| 12'h9-12'h1FF | RX1:Reserved | |
| 12'h200 to 12'h3FF | RX2:Same registers are defined in this region for RX2 as for RX1 above. | |
| 12'h400 | TX1:PHY TX Control0 | N/A for SerDes Architecture |
| 12'h401 | TX1:PHY TX Control1 | N/A for SerDes Architecture |
| 12'h402 | TX1:PHY TX Control2 | |
| 12'h403 | TX1:PHY TX Control3 | |
| 12'h404 | TX1:PHY TX Control4 | |
| 12'h405 | TX1:PHY TX Control5 | |
| 12'h406 | TX1:PHY TX Control6 | |
| 12'h407 | TX1:PHY TX Control7 | |
| 12'h408 | TX1:PHY TX Control8 | |
| 12'h409 | TX1:PHY TX Control9 | |
| 12'h40A - 12'h5FF | TX1:Reserved | |
| 12'h600 - 12'h7FF | TX2:Same registers are defined in this region for TX2 as for TX1 above. | |
| 12'h800 | CMN1:PHY Common Control0 | N/A for SerDes Architecture |
| 12'h801 - 12'h9FF | CMN1:Reserved | |
| 12'hA00 - | CMN2:Same registers are defined in this region for | |

FIG. 12B

Address 6h: PHY RX Control3

| Bit | Default | Attribute | Required | Description |
|---|---|---|---|---|
| [7:3] | 0h | N/A | N/A | Reserved |
| [2] | 0h | Level | PCIe | InvalidRequest-This field is used to indicate that the Link Evaluation feedback requested a link partner TX EQ setting that was out of range. The MAC sets this bit to '1' when it detects an out of range error locally based on calculated link partner transmitter coefficients based on the last valid link equalization feedback or it receives a NACK response from the link partner. The MAC resets this bit to '0' the next time it asserts RxEQEval. When a MAC sets this bit, it shall subsequently ask the PHY to perform an RxEQ evaluation using the last valid setting a second time.<br><br>This field is only applicable at the 8.0 GT/s, 16 GT/s, 32GT/s, and 64GT/s signaling rates. |
| [1] | 0h | Level | PCIe, USB4, DisplayPort RX (optional) | RxEqInProgress-This field is used by the MAC to indicate when link equalization evaluation is in progress.<br><br>The PHY may optionally use this field to enable and disable functionality that is only needed during link equalization evaluations.<br><br>For PCIe:<br>The MAC sets this bit to '1' at the same time as it sets RxEqEval to '1' in phase 2 or phase 3 of that link equalization process. The MAC resets this bit to '0' at the end of phase 2 or phase 3. |
| [0] | 0h | Level | PCIe, USB4, DisplayPort RX (optional) | RxEqEval -- This field is set to '1' by the MAC to instruct the PHY to start evaluation of the far end transmitter TX EQ settings.<br><br>For PCI Express, this field is only used at the 8.0 GT/s, 16GT/s, 32GT/s, and 64 GT/s signaling rates. |

FIG. 13A

MAC Registers

| Byte Address | Register Name | Notes |
|---|---|---|
| 12'h0 | RX1:RX Margin Status0 | |
| 12'h1 | RX1:RX Margin Status1 | |
| 12'h2 | RX1:RX Margin Status2 | |
| 12'h3 | RX1:Elastic Buffer Status | N/A for SerDes Architecture |
| 12'h4 | RX1:Elastic Buffer Location | N/A for SerDes Architecture |
| 12'h5 | RX1:RX Status0 | |
| 12'h6 | RX1:RX Control0 | |
| 12'h7-12'h9 | RX1:Reserved | |
| 12'hA | RX1:RX Link Evaluation Status0 | |
| 12'hB | RX1:RX Link Evaluation Status1 | |
| 12'hC | RX1:RX Status4 | |
| 12'hD | RX1:RX Status5 | |
| 12'hE | RX1:RX Link Evaluation Status2 | |
| 12'hF | RX1:RX Link Evaluation Status3 | |
| 12'h10-12'h1FF | RX1:Reserved | |
| 12'h200 to 12'h3FF | RX2:Same registers are defined in this region for RX2 as for RX1 above. | |
| 12'h400 | TX1:TX Status0 | |
| 12'h401 | TX1:TX Status1 | |
| 12'h402 | TX1:TX Status2 | |
| 12'h403 | TX1:TX Status3 | |
| 12'h404 | TX1:TX Status4 | |
| 12'h405 | TX1:TX Status5 | |
| 12'h406 | TX1:TX Status6 | |
| 12'h407 | TX1:TX Status7 | |
| 12'h408 | TX1:TX Status8 | |
| 12'h409 | TX1:TX Status9 | |
| 12'h40A-12'h5FF | TX1:Reserved | |
| 12'h600-12'h7FF | TX2:Same registers are defined in this region for TX2 as for TX1 above. | |

FIG. 13B

Address Bh: RX Link Evaluation Status1

| Bit | Default | Attribute | Required | Description |
|---|---|---|---|---|
| [7:6] | 0h | N/A | N/A | Reserved |
| [5:0] | 0h | Level | PCIe | LinkEvaluationFeddbackDirectionChange[5:0] -- This field provides the link equalization evaluation feedback in the direction change format. Feedback is provided for each coefficient:<br><br>[1:0] $C_{-1}$<br>[3:2] $C_0$<br>[5:4] $C_1$<br><br>The feedback value for each coefficient is encoded as follows:<br><br>00 - No change<br>01 - Increment<br>10 - Decrement<br>11 - Reserved |

FIG. 14A

```
//From PHY to MAC
input [5:0]    pipe_localfs,
input [5:0]    pipe_locallf,
input [5:0]    pipe_localg4fs,
input [5:0]    pipe_localg4lf,
input [5:0]    pipe_localg5fs,
input [5:0]    pipe_localg5lf, input          pipe_linkeval_done,          // Pulse
input [5:0]    pipe_linkeval_dirchng,
input [7:0]    pipe_linkeval_fom, input          pipe_localtxcoefficientsvalid,   // Pulse
input [17:0]   pipe_localtxpresetcoefficients,
```

FIG. 14B

```
//From MAC to PHY
output         pipe_rxpolarity,
output         pipe_ebuf_mode,
output         pipe_invalidrequest,
output         pipe_rxeqinprogress,
output         pipe_rxeqeval,
output         pipe_blockaligncontrol,
output [17:0]  pipe_txdeemph
output         pipe_getlocalpresetcoefficients,
output [5:0]   pipe_localpresetcoefficient,
output [5:0]   pipe_fs,
output [5:0]   pipe_lf,
output         pipe_txswing
output [2:0]   pipe_txmargin,
```

SYSTEM INCLUDING PIPE5 TO PIPE4 CONVERTER AND METHOD THEREOF

BACKGROUND

1. Field

Embodiments of the present disclosure relate to a high-speed serial computer expansion bus standard in computing systems.

2. Description of the Related Art

The computer environment paradigm has shifted to ubiquitous computing systems that can be used anytime and anywhere. As a result, the use of portable electronic devices such as mobile phones, digital cameras, and notebook computers has rapidly increased. These portable electronic devices generally use a memory system having memory device(s), that is, data storage device(s). The data storage device is used as a main memory device or an auxiliary memory device of the portable electronic devices.

Memory systems using memory devices provide excellent stability, durability, high information access speed, and low power consumption, since they have no moving parts. Examples of memory systems having such advantages include universal serial bus (USB) memory devices, memory cards having various interfaces such as a universal flash storage (UFS), and solid state drives (SSDs). Memory systems may perform operations in response to commands (or requests) from a host device. Memory systems may be coupled to the host device through one or more various interface protocols such as a universal serial bus (USB), a multi-media card (MMC) and/or a peripheral component interconnect express (PCI-e or PCIe).

PCIe is a high-speed serial computer expansion bus standard that is widely used in many computing and communication systems. PCIe provides high speed data transfer and low latency owing to its dedicated point to point topology. To accelerate verification and device development time for PCIe based sub-systems, PHY Interface for PCI Express (PIPE) architecture was defined by Intel Corporation. Over time, PIPE has evolved from PIPE1 to PIPE6. The PIPE specifications from PIPE1 to PIPE4 are backward compatible. However, PIPE4 and PIPE5/PIPE6 are not compatible. In this context, embodiments of the invention arise.

SUMMARY

Aspects of the present invention include a system and a method to provide compatibility between a PIPE5 controller and a PIPE4 test device.

In one aspect, a system includes: a physical interface for the PCI express (PCIe) PIPE5 controller including a plurality of media access control (MAC) registers; a PIPE4 device; and a converter including a first interface coupled to the PIPE5 controller through a message bus interface, a second interface coupled to the PIPE4 device through a PCIe link and a plurality of physical (PHY) registers. When a first message bus interface signal is received from the PIPE5 controller, the first interface finds a target PHY register among the plurality of PHY registers based on the first message bus interface signal, and the second interface generates a first link interface signal associated with the target PHY register and outputs the first link interface signal to the PIPE4 device. When a second link interface signal is received from the PIPE4 device, the first interface finds a target MAC register among the plurality of MAC registers based on the second link interface signal and outputs a second message bus interface signal to write the target MAC register based on the second link interface signal.

In another aspect, a method for coupling between a PCI express (PCIe) PIPE5 controller and a PIPE4 device includes: providing a converter including a first interface coupled to the PIPE5 controller including a plurality of media access control (MAC) registers through a message bus interface, a second interface coupled to the PIPE4 device through a PCIe link and a plurality of physical (PHY) registers; when a first message bus interface signal is received from the PIPE5 controller, performing a first operation; and when a second link interface signal is received from the PIPE4 device, performing a second operation. The first operation includes: finding, by the first interface, a target PHY register among the plurality of PHY registers based on the first message bus interface signal; and generating, by the second interface, a first link interface signal associated with the target PHY register and outputting the first link interface signal to the PIPE4 device. The second operation includes: finding, by the first interface, a target MAC register among the plurality of MAC registers based on the second link interface signal; and outputting, by the first interface, a second message bus interface signal to write the target MAC register based on the second link interface signal.

Additional aspects of the present invention will become apparent from the following description.

BRIEF DESCRIPTION OF THE DRAWINGS

FIG. 4 is a diagram illustrating PHY requirements for different interfaces and architectures.

FIGS. 5A and 5B are diagrams illustrating incompatibility between PIPE4 and PIPE5.

FIGS. 8 to 11 are diagrams illustrating message bus interface signals in accordance with an embodiment of the present invention.

FIGS. 12A and 12B are diagrams illustrating PHY registers and a target PHY register in accordance with an embodiment of the present invention.

FIGS. 13A and 13B are diagrams illustrating MAC registers and a target MAC register in accordance with an embodiment of the present invention.

FIGS. 14A and 14B are diagrams illustrating examples of signals to be converted by the PIPE5 to PIPE4 converter 630 in accordance with an embodiment of the present invention.

DETAILED DESCRIPTION

Figure 1:
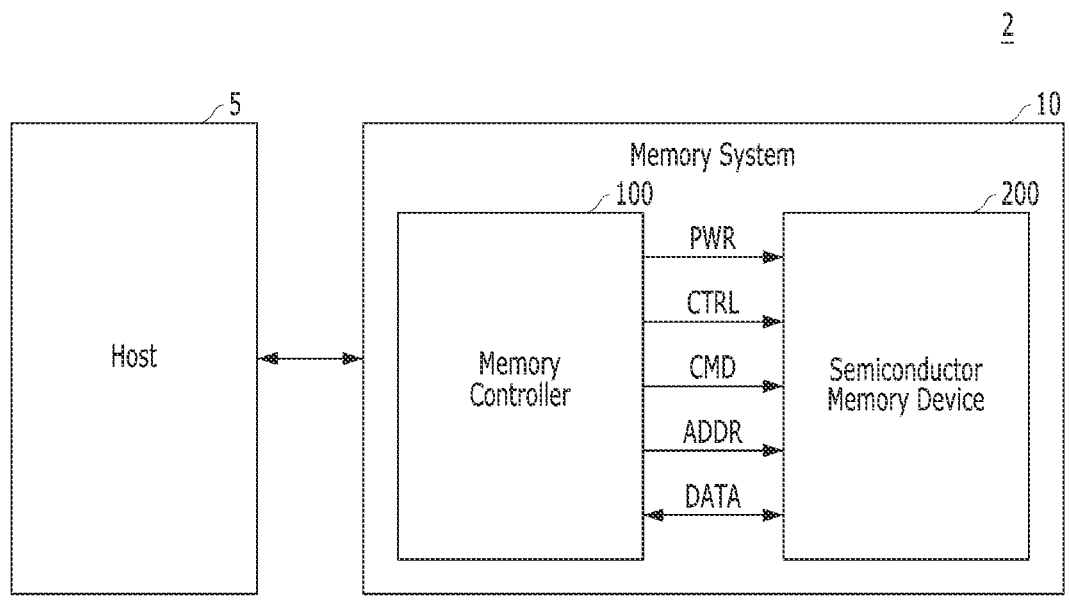
FIG. 1 is a block diagram illustrating a data processing system in accordance with an embodiment of the present invention.

Various embodiments of the present invention are described below in more detail with reference to the accompanying drawings. The present invention may, however, be embodied in different forms and thus should not be construed as limited to the embodiments set forth herein. Rather, these embodiments are provided so that this disclosure is thorough, complete and fully conveys the scope of the present invention to those skilled in the art. Moreover, reference herein to "an embodiment," "another embodiment," or the like is not necessarily to only one embodiment, and different references to any such phrase are not necessarily to the same embodiment(s). Throughout the disclosure, like reference numerals refer to like parts in the figures and embodiments of the present invention.

The invention can be implemented in numerous ways, including as a process; an apparatus; a system; a computer program product embodied on a computer-readable storage medium; and/or a processor, such as a processor suitable for executing instructions stored on and/or provided by a memory coupled to the processor. In this specification, these implementations, or any other form that the invention may take, may be referred to as techniques. In general, the order of the operations of disclosed processes may be altered within the scope of the invention. Unless stated otherwise, a component such as a processor or a memory described as being suitable for performing a task may be implemented as a general component that is temporarily configured to perform the task at a given time or a specific component that is manufactured to perform the task. As used herein, the term 'processor' or the like refers to one or more devices, circuits, and/or processing cores suitable for processing data, such as computer program instructions.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing methods herein.

When implemented in at least partially in software, the controllers, processors, devices, modules, units, multiplexers, generators, logic, interfaces, decoders, drivers, generators and other signal generating and signal processing features may include, for example, a memory or other storage device for storing code or instructions to be executed, for example, by a computer, processor, microprocessor, controller, or other signal processing device.

A detailed description of embodiments of the present invention is provided below along with accompanying figures that illustrate aspects of the invention. The present invention is described in connection with such embodiments, but the present invention is not limited to any embodiment. The scope of the invention is limited only by the claims. The present invention encompasses numerous alternatives, modifications and equivalents within the scope of the claims. Numerous specific details are set forth in the following description in order to provide a thorough understanding of the present invention. These details are provided for the purpose of example; the present invention may be practiced according to the claims without some or all of these specific details. For clarity, technical material that is known in technical fields related to the present invention has not been described in detail so that the present invention is not unnecessarily obscured.

FIG. 1 is a block diagram illustrating a data processing system 2 in accordance with an embodiment of the present invention.

Referring FIG. 1, the data processing system 2 may include a host device 5 and a memory system 10. The memory system may receive a request from the host device 5 and operate in response to the received request. For example, the memory system may store data to be accessed by the host device 5.

The host device 5 may be implemented with any of various types of electronic devices. In various embodiments, the host device may include an electronic device such as a desktop computer, a workstation, a three-dimensional (3D) television, a smart television, a digital audio recorder, a digital audio player, a digital picture recorder, a digital picture player, and/or a digital video recorder and a digital video player. In various embodiments, the host device 5 may include a portable electronic device such as a mobile phone, a smart phone, an e-book, an MP3 player, a portable multimedia player (PMP), and/or a portable game player.

The memory system 10 may be implemented with any of various types of storage devices such as a solid state drive (SSD) and a memory card. In various embodiments, the memory system 10 may be provided as one of various components in an electronic device such as a computer, an ultra-mobile personal computer (PC) (UMPC), a workstation, a net-book computer, a personal digital assistant (PDA), a portable computer, a web tablet PC, a wireless phone, a mobile phone, a smart phone, an e-book reader, a portable multimedia player (PMP), a portable game device, a navigation device, a black box, a digital camera, a digital multimedia broadcasting (DMB) player, a 3-dimensional television, a smart television, a digital audio recorder, a digital audio player, a digital picture recorder, a digital picture player, a digital video recorder, a digital video player, a storage device of a data center, a device capable of receiving and transmitting information in a wireless environment, a radio-frequency identification (RFID) device, as well as one of various electronic devices of a home network, one of various electronic devices of a computer network, one of electronic devices of a telematics network, or one of various components of a computing system.

The memory system 10 may include a memory controller 100 and a semiconductor memory device 200. The memory controller 100 may control overall operation of the semiconductor memory device 200.

The semiconductor memory device 200 may perform one or more erase, program, and read operations under the control of the memory controller 100. The semiconductor memory device 200 may receive a command CMD, an address ADDR and data DATA through input/output lines. The semiconductor memory device 200 may receive power PWR through a power line and a control signal CTRL through a control line. The control signal CTRL may include a command latch enable signal, an address latch enable signal, a chip enable signal, a write enable signal, a read enable signal, as well as other operational signals depending on design and configuration of the memory system 10.

The memory controller 100 and the semiconductor memory device 200 may be integrated in a single semiconductor device such as a solid state drive (SSD). The SSD may include a storage device for storing data therein. When the semiconductor memory system 10 is used in an SSD, operation speed of a host device (e.g., host device 5 of FIG. 1) coupled to the memory system 10 may remarkably improve.

The memory controller 100 and the semiconductor memory device 200 may be integrated in a single semiconductor device such as a memory card. For example, the memory controller 100 and the semiconductor memory device 200 may be integrated to configure a personal computer (PC) card of personal computer memory card international association (PCMCIA), a compact flash (CF) card, a smart media (SM) card, a memory stick, a multimedia card (MMC), a reduced-size multimedia card (RS-MMC), a micro-size version of MMC (MMCmicro), a secure digital (SD) card, a mini secure digital (miniSD) card, a micro secure digital (microSD) card, a secure digital high capacity (SDHC), and/or a universal flash storage (UFS).

Figure 2:
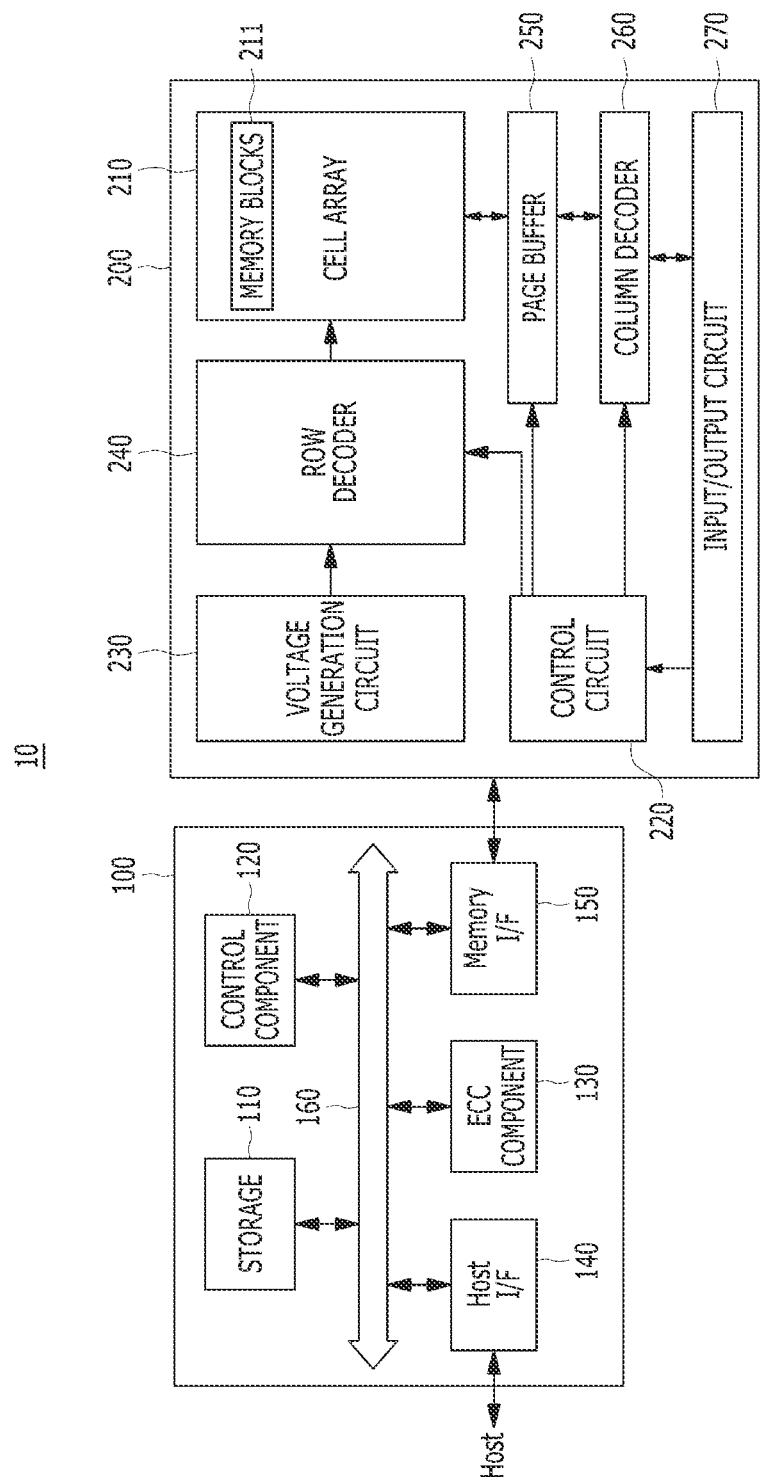
FIG. 2 is a block diagram illustrating a memory system in accordance with an embodiment of the present invention.

FIG. 2 is a block diagram illustrating a memory system in accordance with an embodiment of the present invention. For example, the memory system of FIG. 2 may depict the memory system 10 shown in FIG. 1.

Referring to FIG. 2, the memory system 10 may include a memory controller 100 and a semiconductor memory device 200. The memory system 10 may operate in response to a request from a host device (e.g., host device 5 of FIG. 1), and in particular, store data to be accessed by the host device.

The memory device 200 may store data to be accessed by the host device.

The memory device 200 may be implemented with a volatile memory device such as a dynamic random access memory (DRAM) and/or a static random access memory (SRAM), or a non-volatile memory device such as a read only memory (ROM), a mask ROM (MROM), a programmable ROM (PROM), an erasable programmable ROM (EPROM), an electrically erasable programmable ROM (EEPROM), a ferroelectric random access memory (FRAM), a phase change RAM (PRAM), a magnetoresistive RAM (MRAM), and/or a resistive RAM (RRAM).

The controller 100 may control storage of data in the memory device 200. For example, the controller 100 may control the memory device 200 in response to a request from the host device. The controller 100 may provide data read from the memory device 200 to the host device, and may store data provided from the host device into the memory device 200.

The controller 100 may include a storage 110, a control component 120 which may be implemented as a processor such as a central processing unit (CPU), an error correction code (ECC) component 130, a host interface (I/F) 140 and a memory interface (I/F) 150, which are coupled through a bus 160.

The storage 110 may serve as a working memory of the memory system 10 and the controller 100, and store data for driving the memory system 10 and the controller 100. When the controller 100 controls operations of the memory device 200, the storage 110 may store data used by the controller 100 and the memory device 200 for such operations as read, write, program and erase operations.

The storage 110 may be implemented with a volatile memory such as a static random access memory (SRAM) or a dynamic random access memory (DRAM). As described above, the storage 110 may store data used by the host device in the memory device 200 for the read and write operations. To store the data, the storage 110 may include a program memory, a data memory, a write buffer, a read buffer, a map buffer, and the like.

The control component 120 may control general operation of the memory system 10, and in particular a write operation and a read operation for the memory device 200 in response to a corresponding request from the host device. The control component 120 may drive firmware, which is referred to as a flash translation layer (FTL), to control general operations of the memory system 10. For example, the FTL may perform operations such as logical-to-physical (L2P) mapping, wear leveling, garbage collection, and/or bad block handling. The L2P mapping is known as logical block addressing (LBA).

The ECC component 130 may detect and correct errors in the data read from the memory device 200 during the read operation. The ECC component 130 may not correct error bits when the number of the error bits is greater than or equal to a threshold number of correctable error bits, and instead may output an error correction fail signal indicating failure in correcting the error bits.

In various embodiments, the ECC component 130 may perform an error correction operation based on a coded modulation such as a low density parity check (LDPC) code, a Bose-Chaudhuri-Hocquenghem (BCH) code, a turbo code, a turbo product code (TPC), a Reed-Solomon (RS) code, a convolution code, a recursive systematic code (RSC), a trellis-coded modulation (TCM), or a Block coded modulation (BCM). However, error correction is not limited to these techniques. As such, the ECC component 130 may include any and all circuits, systems or devices for suitable error correction operation.

The host interface 140 may communicate with the host device through one or more of various communication standards or interfaces such as a universal serial bus (USB), a multi-media card (MMC), a peripheral component interconnect express (PCI-e or PCIe), a small computer system interface (SCSI), a serial-attached SCSI (SAS), a serial advanced technology attachment (SATA), a parallel advanced technology attachment (PATA), an enhanced small disk interface (ESDI), and/or an integrated drive electronics (IDE).

The memory interface 150 may provide an interface between the controller 100 and the memory device 200 to allow the controller 100 to control the memory device 200 in response to a request from the host device. The memory interface 150 may generate control signals for the memory device 200 and process data under the control of the control component 120. When the memory device 200 is a flash memory such as a NAND flash memory, the memory interface 150 may generate control signals for the memory and process data under the control of the control component 120.

The memory device 200 may include a memory cell array 210, a control circuit 220, a voltage generation circuit 230, a row decoder 240, a page buffer 250 which may be in the form of an array of page buffers, a column decoder 260, and an input and output (input/output) circuit 270. The memory cell array 210 may include a plurality of memory blocks 211 which may store data. The voltage generation circuit 230, the row decoder 240, the page buffer array 250, the column decoder 260 and the input/output circuit 270 may form a peripheral circuit for the memory cell array 210. The peripheral circuit may perform a program, read, or erase operation on the memory cell array 210. The control circuit 220 may control the peripheral circuit.

The voltage generation circuit 230 may generate operation voltages of various levels. For example, in an erase operation, the voltage generation circuit 230 may generate operation voltages of various levels such as an erase voltage and a pass voltage.

The row decoder 240 may be in electrical communication with the voltage generation circuit 230, and the plurality of memory blocks 211. The row decoder 240 may select at least one memory block among the plurality of memory blocks 211 in response to a row address generated by the control circuit 220, and transmit operation voltages supplied from the voltage generation circuit 230 to the selected memory blocks.

Figure 3:
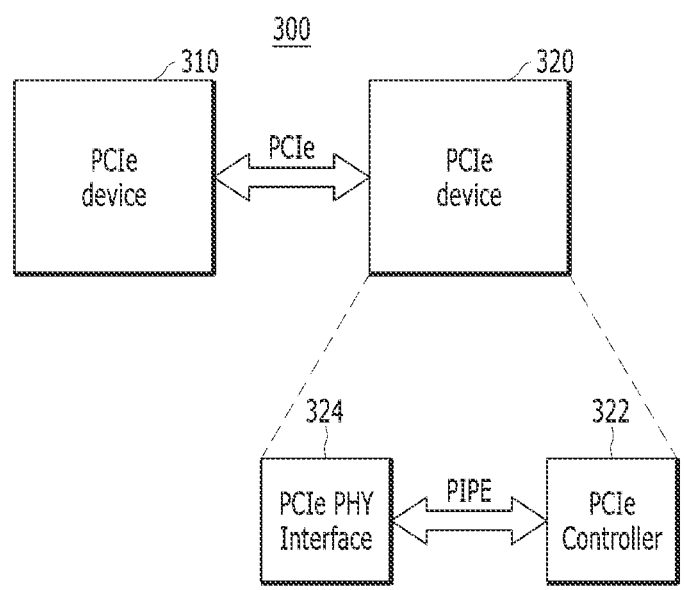
FIG. 3 is a diagram illustrating a data processing system including two PCIe devices in accordance with an embodiment of the present invention.

The page buffer 250 may be coupled with the memory cell array 210 through bit lines BL (shown in FIG. 3). The page buffer 250 may precharge the bit lines BL with a positive voltage, transmit data to, and receive data from, a selected memory block in program and read operations, or temporarily store transmitted data in response to page buffer control signal(s) generated by the control circuit 220.

The column decoder 260 may transmit data to, and receive data from, the page buffer 250 or transmit and receive data to and from the input/output circuit 270.

The input/output circuit 270 may transmit to the control circuit 220 a command and an address, received from an external device (e.g., the memory controller 100 of FIG. 1), transmit data from the external device to the column decoder 260, or output data from the column decoder 260 to the external device, through the input/output circuit 270.

The control circuit 220 may control the peripheral circuit in response to the command and the address.

FIG. 3 is a diagram illustrating a data processing system 300 including two peripheral component interconnect express (PCI-e or PCIe) devices in accordance with an embodiment of the present invention.

Referring to FIG. 3, the data processing system (or computing system) 300 may include two PCIe devices 310 and 320. The PCIe devices 310 and 320 may be coupled to each other through a PCIe link. By way of example and without any limitation, the PCIe device 310 may be the host device 5 and the PCIe device 320 may be the storage device (or memory system) 10, as shown in FIGS. 1 and 2. In some embodiments, the PCIe device 320 may be a NAND controller system on-chip (SoC) which is implemented with a PCIe controller 322 and a PCIe PHY interface 324. The PCIe controller 322 and the PCIe physical layer (PHY) interface 324 may be coupled through a PIPE (PHY Interface for the PCI Express) interface (link). This implementation is described in U.S. Pat. No. 10,817,443, entitled "CONFIGURABLE INTERFACE CARD" which is incorporated by reference herein in its entirety.

PCIe is a multi-layered serial bus protocol which implements a dual-simplex link. It provides high speed data transfer and low latency owing to its dedicated point to point topology. There is a PIPE (PHY Interface for the PCI Express) specification which defines a PHY internal interface to a PCIe controller. PIPE is a standard interface defined between a sublayer of a physical (PHY) layer (i.e., a physical coding sublayer (PCS)) and a media access control (MAC) layer. The PHY layer may include the PCS layer coupled to the MAC layer through the PIPE interface, and a physical media attachment (PMA) layer coupled to PCS layer. This PIPE specification allows a flexible combination between PHY IP vendors and PCIe controller IP vendors, without requiring both IPs from the same vendor.

PCIe has evolved and is entering a stage of 5th generation (Gen5)/6th generation (Gen6). PCIe Gen5 is using PIPE5.1, whereas PCIe Gen6 is using PIPE6. When PCIe is moving from Gen1 to Gen4, the PIPE specification is moving from PIPE1 to PIPE4, respectively. The PIPE spec from PIPE1 up to PIPE4 is backward compatible, whereas PIPE4 and PIPE5/PIPE6 are not compatible, with reference to Table 2-1 of the specification "PHY Interface For the PCI Express, SATA, USB 3.1, DisplayPort, and USB4 Architectures Version 6.0" (hereinafter referred to as "the PIPE Specification") as shown in FIG. 4.

Referring to FIG. 4, a 'Legacy Pin interface' is not allowed for PCIe 5/PCIe 6. However, it is required for PCIe 4.0 and less. This incompatibility may cause issues for simulation and/or validation of PCIe controllers and SoC including the PCIe controllers. In the illustrated example of FIG. 5A, if versions of a PCIe controller, a PCIe PHY interface and a simulation/validation device are PIPE5, a PCIe Gen5 test would be performed. In many cases, it is necessary to setup a lower speed test environment (e.g., FPGA/emulation/simulation). The lower speed corresponds to Gen4 and Gen3, which requires PIPE4 (e.g., up to 16 gigatransfers per second (GT/s)). Thus, if a version of a PCIe controller is PIPE5 and a version of a simulation/validation device is PIPE4, a PCIe Gen4 or Gen3 test would not be performed. That is, PIPE4 is not implemented in a PIPE5 controller. Accordingly, it is desirable to provide a scheme to provide compatibility between a PCIe controller and a test device (i.e., simulation/validation) with different versions. In some embodiments, as shown in FIG. 5B, a PIPE5 PCIe controller may be compatible with a PIPE4 device through a PIPE5 to PIPE4 converter such that a PCIe Gen4 or Gen3 test is performed. In FIG. 5B, it is illustrated that a PIPE5 to PIPE4 converter is used and a PCIe PHY interface is not used when a PCIe controller and a test device have the different versions. Further, it is illustrated that a PIPE5 to PIPE4 converter is not used and a PCIe PHY interface is used when a PCIe controller and a test device have the same version.

Figure 6:
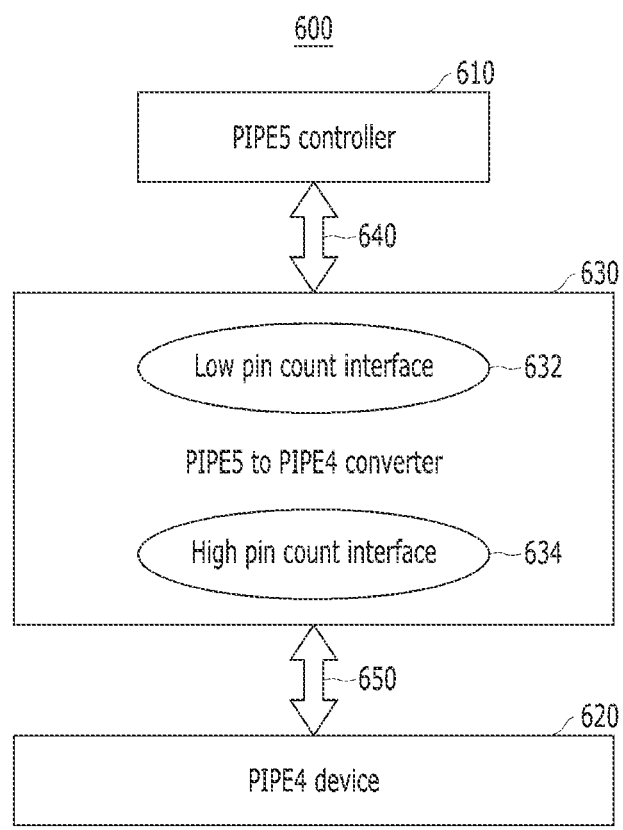
FIG. 6 is a diagram illustrating a data processing system including a PIPE5 to PIPE4 converter in accordance with an embodiment of the present invention.

FIG. 6 is a diagram illustrating a data processing system 600 including a PIPE5 to PIPE4 converter 630 in accordance with an embodiment of the present invention.

Referring to FIG. 6, the data processing system 600 may including a PIPE5 controller 610, a PIPE4 device 620 and the PIPE5 to PIPE4 converter 630. The PIPE5 controller 610 represents a PCIe controller according to the PIPE specification version 5 (i.e., PIPE5), which supports a first link speed (e.g., 32 GT/s). The PIPE4 device 620 may include a test device for simulation and validation according to the PIPE specification version 4 (i.e., PIPE4), which supports a second link speed lower than the first link speed (e.g., up to 16 GT/s). In some embodiments, the PIPE4 device 620 may be a verification IP (VIP), FPGA or emulation device. A message bus interface 640 may be coupled to interface between the PIPE5 controller 610 and the PIPE5 to PIPE4 converter 630. A PICe link 650 may be coupled to interface between the PIPE4 device 620 and the PIPE5 to PIPE4 converter 630. The message bus interface (i.e., PIPE5 interface) 640 may follow and conform to the PIPE5 specification. The PICe link (i.e., PIPE4 interface) 650 may follow and conform to the PIPE4 specification.

The PIPE5 to PIPE4 converter 630 may include a low pin count interface 632 as a first interface and a high pin count interface 634 as a second interface. The low pin count interface 632 may follow and conform to the PIPE5 specification. The high pin count interface 634 may follow and conform to the PIPE4 specification. The low pin count interface 632 may implement a low pin count state machine. The high pin count interface 634 may implement high pin count signal generations. The low pin count interface 632 may be coupled to the PIPE5 controller 610 through the message bus interface 640. The high pin count interface 634 may be coupled to the PIPE4 device 620 through the PCIe link 650.

The low pin count interface 632 may transfer all the related information through the message bus interface 640. Thus, the low pin count state machine may implement a message bus.

Figure 7:
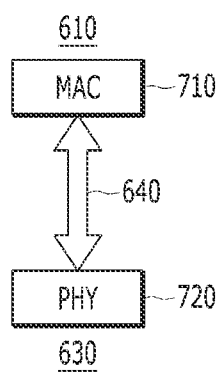
FIG. 7 is a diagram illustrating a connection between a PIPE5 controller and a PIPE5 to PIPE4 converter in accordance with an embodiment of the present invention.

The PIPE5 to PIPE4 converter 630 may use address spaces to enable the message bus interface 640 between a MAC layer 710 and a PHY layer 720 as shown in FIG. 7. These address spaces (e.g., 12-bit address spaces) may be used to host registers associated with certain PIPE operations. In some embodiments, the MAC layer 710 and the PHY layer 720 may include address spaces, i.e., a plurality of MAC registers and a plurality of PHY registers, respectively. Each address space may be divided into four main regions: receiver address region (RX), transmitter address region (TX), common address region (CMN) and vendor specific address region. The MAC and PHY layers 710 and 720 may access specific bits in the registers to initiate operations, to participate in handshake, or to indicate status. The MAC layer 710 may initiate requests on the message bus interface 640 to access registers hosted in the PHY address space (i.e., PHY registers). The PHY layer 720 may initiate requests on the message bus interface 640 to access registers hosted in the MAC address space (i.e., MAC registers).

Figure 11:
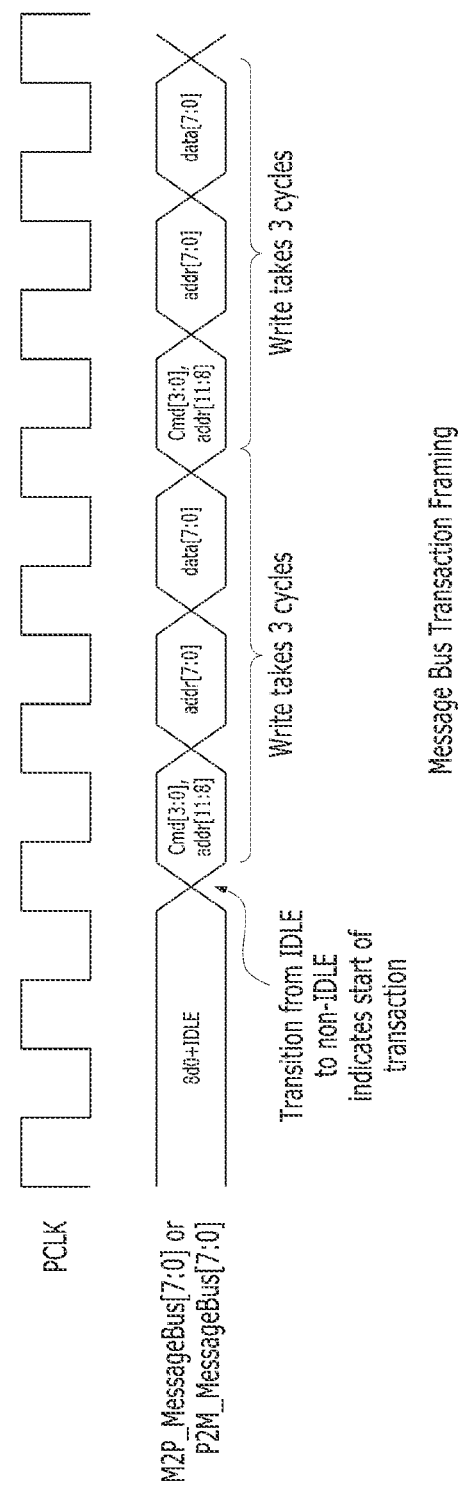

The low pin count interface 632 may transfer message bus interface signals between the PIPE5 controller 610 and the PIPE5 to PIPE4 converter 630. In some embodiments, as shown in FIG. 8, the message bus interface signals may include signals (i.e., command, address and data) such as M2P_MessageBus[7:0] as input from the PIPE5 controller 610 and M2P_MessageBus[7:0] as output to the PIPE5 controller 610. Message bus commands (e.g., write_uncommitted, write_committed, read, read completion, write_ack) are illustrated in FIG. 9. Various message bus transaction timings such as are illustrated in FIGS. 10A-10D. FIG. 10A illustrates command only message bus transaction timing (NOP, write_ack). FIG. 10B illustrates {command+address} message bus transaction timing (Read). FIG. 10C illustrates {command+data} message bus transaction timing (Read completion). FIG. 10D illustrates {command+address+data} message bus transaction timing (Write_uncommitted, Write_committed). In FIG. 10B, for a read operation, Command [3:0] and Addr[11:8] are transferred at (t) and Addr [7:0] are transferred at (t+1). In FIG. 10D, for a write operation, Command [3:0] and Addr[11:8] are transferred at (t), Addr[7:0] are transferred at (t+1) and Data[7:0] are transferred at (t+2). Message bus transaction framing is illustrated in FIG. 11. As shown in FIG. 11, a write operation takes 3 cycles (i.e., {cmd[3:0]+addr[11:8]}, addr[7:0] and data[7:0]).

FIG. 7 is a diagram illustrating a connection between the PIPE5 controller 610 and the PIPE5 to PIPE4 converter 630 in accordance with an embodiment of the present invention.

Referring to FIG. 7, the PIPE5 to PIPE4 converter (hereinafter referred to as the converter) 630 may be coupled to the PIPE5 controller 610 through the message bus interface 640. The message bus interface 640 may define a PIPE5 interface and the functional portioning between the MAC layer 710 of the PIPE5 controller 610 and the PHY layer 720 of the converter 630. The PHY layer 720 may include a physical coding sublayer (PCS) coupled to the message bus interface 640 and a physical media attachment (PMA) layer coupled to the PCS layer. In some embodiments, command, data (e.g., TxData, TxDataK, RxData, RxDataK) and signals (e.g., Status, PCLK) may be transferred between the MAC layer 710 and the PHY layer 720. As noted above, the MAC layer 710 and the PHY layer 720 may include address spaces, i.e., a plurality of MAC registers and a plurality of PHY registers, respectively.

Implementations of the PHY registers and the MAC registers are illustrated in FIGS. 12A and 13A, respectively. As shown in FIG. 12A, there are multiple PHY registers, which include a receiver region (RX1, RX2), a transmitter region (TX1, TX2) and a common region (CMN1, CMN2), and each register corresponds to a particular value of byte addresses (i.e., 12'h0-12'hA00). For example, the address "12'h6" (i.e., 6 h) corresponds to a register PHY Rx Control 3. The register PHY Rx Control 3 may be used to control receiver functionality as shown in FIG. 12B. As shown in FIG. 13A, there are multiple MAC registers, which include a receiver region (RX1, RX2) and a transmitter region (TX1, TX2), and each register corresponds to a particular value of byte addresses (i.e., 12'h0-12'h7FF). For example, the address "12'hB" (i.e., Bh) corresponds to a register MAC Rx Link Evaluation Status 1. The register MAC Rx Link Evaluation Status 1 may be used to control receiver functionality as shown in FIG. 12B. These registers may be accessed via read and write commands driven over the signals in FIGS. 8 and 9.

When a first message bus interface signal is received from the PIPE5 controller 610 through the message bus interface 640, the low pin count interface 632 may find a target PHY register among the PHY registers based on the first message bus interface signal including a command, an address and/or data. In some embodiments, the converter 630 may include a decoder for decoding the address in the first message bus interface signal to find the target PHY register and to determine the content of the target PHY register. Then, the high pin count interface 634 may generate a first link interface signal associated with the target PHY register and may output the first link interface signal to the PIPE4 device 620 through the PCIe link 650. In some embodiments, the first link interface signal may include at least one signal which is indicated by a content of the target PHY register.

As such, the low pin count interface 632 uses register space write and read with the message bus interface 640. When the MAC layer 710 of the PIPE5 controller 610 issues message bus write to a particular PHY register space, the converter 630 decodes a content of the PHY register space and drives (generates) proper PIPE4 signals to output to the PIPE4 device 620 through the PCIe link 650.

For example, when the PIPE5 controller 610 sends out message bus write to the register PHY RX Control3 in FIG. 12A, the converter 630 takes bits [2], [1], [0] of data in the register PHY RX Control3 as shown in FIG. 12B and generates proper PCIe link interface signals. These bits correspond to a PCIe link interface signal associated with InvalidRequest, RxEqInProgress, RxEqEval in the PICe link 650 (i.e., PIPE4 interface) 650. InvalidRequest represents a signal used to indicate that the link evaluation feedback requested a link partner TX equalization (EQ) setting that was out of range. RxEqInProgress represents a signal used by the MAC to indicate when link equalization evaluation is in progress. RxEqEval represents a signal used to instruct the PHY to start evaluation of the far end transmitter TX EQ settings. Then, the converter 630 may send out the PCIe link interface signals, i.e., InvalidRequest, RxEqInProgress, RxEqEval, to the PIPE4 device 620 through the PICe link 650. At a same time, the converter 630 may send back a message bus response to the PIPE5 controller 610.

When a second link interface signal is received from the PIPE4 device 620 through the second interface 634, the first interface 632 may find a target MAC register among the MAC registers based on the second link interface signal, i.e., an address in the second link interface signal. Further, the first interface 632 may output a second message bus interface signal to the PIPE5 controller 610 through the message bus interface 640. The second message bus interface signal may be a request to write data in the second link interface signal to the target MAC register corresponding to the second link interface signal.

As such, when the PIPE4 device 620 transfers a link interface signal, the converter 630 may decode address and data for the target MAC register based on the link interface signal. Further, the converter 630 may generate a message bus request to the PCIE5 controller 610 with a set scheme (i.e., PIPE5 low pin count communication scheme).

For example, when the PIPE4 device 620 transmits a link interface signal, e.g., LinkEvaluationFeedback DirectionChange[5:0], the converter 630 decodes the link interface signal and finds a target MAC register (i.e., RX1: RX Link Evaluation Status1 with Address Bh) among the MAC registers 710 based on the link interface signal, as shown in FIG. 13B. The converter 630 drives the message bus interface 640 to send write to the target MAC register with Address Bh.

FIGS. 14A and 14B are diagrams illustrating examples of signals to be converted by the PIPE5 to PIPE4 converter 630 in accordance with an embodiment of the present invention.

FIG. 14A illustrates signals for input of the PIPE5 controller 610, i.e., signals transferred from the PHY layer 720 of the PIPE5 to PIPE4 converter 630 to the MAC layer 710 of the PIPE5 controller 610. For example, the signal 'pipe_linkeval_dirchng' in FIG. 14A corresponds to {LinkEvaluationFeedbackDirectionChange} in the MAC register RX Link Evaluation Status 1, as shown in FIGS. 13A and 13B.

FIG. 14B illustrates signals for output of the PIPE5 controller 610, i.e., signals transferred from the MAC layer 710 of the PIPE5 controller 610 to the PHY layer 720 of the PIPE5 to PIPE4 converter 630. For example, the signals 'pipe_invalidrequest', "pipe_rxeginprogress" and "pipe_rxegeval" in FIG. 14B correspond to {InvalidRequest, RxEqInProgress, RxEqEval} in the PHY register PHY RX Control3, as shown in FIGS. 12A and 12B.

As described above, embodiments of the present invention provide a scheme to provide compatibility between a PIPE5 controller and a PIPE4 test device. That is, embodiments provide a system including a PIPE5 to PIPE4 converter and a method thereof. Embodiments may enable the PIPE5 controller (i.e., Gen5) to be validated with low speed FPGA, emulation and VIP simulation device (i.e., PIPE4 device).

Moreover, the embodiments of the present invention have been described in the drawings and specification. Although specific terminologies are used here, those are only to describe the embodiments of the present invention. Therefore, the present disclosure is not restricted to the above-described embodiments and many variations are possible within the spirit and scope of the present disclosure. The embodiments may be combined to form additional embodiments.

Although the foregoing embodiments have been illustrated and described in some detail for purposes of clarity and understanding, the present invention is not limited to the details provided. There are many alternative ways of implementing the present invention, as one skilled in the art will appreciate in light of the foregoing disclosure. The disclosed embodiments are thus illustrative, not restrictive. The present invention is intended to embrace all modifications and alternatives that fall within the scope of the appended claims.

What is claimed is:

1. A system comprising:
   a physical interface for a PCI express (PCIe) PIPE5 controller including a plurality of media access control (MAC) registers;
   a PIPE4 device; and
   a converter including a first interface coupled to the PIPE5 controller through a message bus interface, a second interface coupled to the PIPE4 device through a PCIe link and a plurality of physical (PHY) registers,
   wherein, when a first message bus interface signal is received from the PIPE5 controller, the first interface finds a target PHY register among the plurality of PHY registers based on the first message bus interface signal, and the second interface generates a first link interface signal associated with the target PHY register and outputs the first link interface signal to the PIPE4 device, and
   wherein, when a second link interface signal is received from the PIPE4 device, the first interface finds a target MAC register among the plurality of MAC registers based on the second link interface signal and outputs a second message bus interface signal to write to the target MAC register based on the second link interface signal.

2. The system of claim 1, wherein the first message bus interface signal and the second message bus interface signal include addresses of the target PHY and MAC registers, respectively.

3. The system of claim 1, wherein the first link interface signal includes at least one signal which is indicated by a content of the target PHY register.

4. The system of claim 1, wherein the first interface transmits, to the PIPE5 controller, a message bus response in response to the first message bus interface signal.

5. The system of claim 1, wherein the second link interface signal includes data which is to be written to the target MAC register, and the second message bus interface signal includes the data and an address for the target MAC register.

6. The system of claim 1, wherein the first interface conforms to a PIPE specification version 5.0 and the second interface conforms to a PIPE specification version 4.0.

7. The system of claim 1, wherein the PIPE4 device includes a test device for simulation and validation.

8. A method for coupling between a PCI express (PCIe) PIPE5 controller and a PIPE4 device, the method comprising:
   providing a converter including a first interface coupled to the PIPE5 controller including a plurality of media access control (MAC) registers through a message bus interface, a second interface coupled to the PIPE4 device through a PCIe link and a plurality of physical (PHY) registers;
   when a first message bus interface signal is received from the PIPE5 controller, performing a first operation; and
   when a second link interface signal is received from the PIPE4 device, performing a second operation,
   wherein the first operation includes:
   finding, by the first interface, a target PHY register among the plurality of PHY registers based on the first message bus interface signal; and generating, by the second interface, a first link interface signal associated with the target PHY register and outputting the first link interface signal to the PIPE4 device, and wherein the second operation includes:

finding, by the first interface, a target MAC register among the plurality of MAC registers based on the second link interface signal; and outputting, by the first interface, a second message bus interface signal to write the target MAC register based on the second link interface signal.

9. The method of claim 8, wherein the first message bus interface signal and the second message bus interface signal include addresses of the target PHY and MAC registers, respectively.

10. The method of claim 8, wherein the first link interface signal includes at least one signal which is indicated by a content of the target PHY register.

11. The method of claim 8, further comprising:

transmitting, by the first interface, to the PIPE5 controller, a message bus response in response to the first message bus interface signal.

12. The method of claim 8, wherein the second link interface signal includes data which is to be written to the target MAC register, and the second message bus interface signal includes the data and an address for the target MAC register.

13. The method of claim 8, wherein the first interface conforms to a PIPE specification version 5.0 and the second interface conforms to a PIPE specification version 4.0.

14. The method of claim 8, wherein the PIPE4 device includes a test device for simulation and validation.

* * * * *